(12) United States Patent
Inumaru

(10) Patent No.: US 8,818,378 B2
(45) Date of Patent: Aug. 26, 2014

(54) BASE STATION, MOBILE COMMUNICATION SYSTEM, AND SYSTEM INFORMATION TRANSMISSION METHOD

(75) Inventor: Tadayoshi Inumaru, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/576,549

(22) PCT Filed: Jan. 28, 2011

(86) PCT No.: PCT/JP2011/051708
§ 371 (c)(1),
(2), (4) Date: Aug. 1, 2012

(87) PCT Pub. No.: WO2011/096332
PCT Pub. Date: Aug. 11, 2011

(65) Prior Publication Data
US 2012/0309400 A1 Dec. 6, 2012

(30) Foreign Application Priority Data
Feb. 3, 2010 (JP) .................................. 2010-022073

(51) Int. Cl.
*H04W 36/00* (2009.01)
*H04W 24/00* (2009.01)
*H04M 11/04* (2006.01)
*H04W 4/00* (2009.01)

(52) U.S. Cl.
USPC ..... 455/438; 455/456.5; 455/436; 455/404.1; 455/404.2; 370/331

(58) Field of Classification Search
USPC ............................................. 455/438, 456.5
See application file for complete search history.

(56) References Cited

U.S. PATENT DOCUMENTS

2006/0126563 A1* 6/2006 Kang et al. .................... 370/331
2008/0051087 A1* 2/2008 Ryu et al. ...................... 455/436

(Continued)

FOREIGN PATENT DOCUMENTS

JP 2006-42381 A 2/2006
JP 2006-246006 A 9/2006

(Continued)

OTHER PUBLICATIONS

"ETSI TS 136 300; LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8)"; Jul. 2009; 163 pages total.

(Continued)

*Primary Examiner* — Timothy Pham
(74) *Attorney, Agent, or Firm* — Sughrue Mion, PLLC

(57) ABSTRACT

Provided is a base station that includes a cell that defines an area in which the base station can communicate with a mobile terminal by wireless. The cell is arranged adjacently to the other cell of another base station. The base station includes communication unit 70 that communicates with the other base station, and system information processing unit 40 that simultaneously broadcasts pieces of system information to the mobile terminal currently engaged in communication in the cell. Upon receiving, from the mobile terminal currently engaged in communication, information indicating that the mobile terminal is located in an adjacent area of the cell adjacent to the other cell, system information processing unit 40 acquires, from the other base station via communication unit 70, other system information currently broadcast in the other cell, and transmits the acquired other system information to the mobile terminal currently engaged in communication.

7 Claims, 2 Drawing Sheets

(56) References Cited

U.S. PATENT DOCUMENTS

| | | | |
|---|---|---|---|
| 2008/0119186 A1* | 5/2008 | Song et al. | 455/436 |
| 2010/0075627 A1* | 3/2010 | Roberts et al. | 455/404.1 |
| 2011/0039552 A1* | 2/2011 | Narasimha et al. | 455/425 |
| 2011/0105016 A1* | 5/2011 | Saito et al. | 455/7 |
| 2012/0040636 A1* | 2/2012 | Kazmi | 455/404.2 |

FOREIGN PATENT DOCUMENTS

| | | | |
|---|---|---|---|
| WO | 2007/083541 A1 | 7/2007 | |
| WO | 2009/154204 A1 | 12/2009 | |

OTHER PUBLICATIONS

"ETSI TS 136 331; LTE; Evolved Universal Terrestrial Radio Access (E-UTRA); Radio Resource Control (RRC); Protocol specification (3GPP TS 36.331 version 8.6.0 Release 8)"; Jul. 2009; 211 pages total.

"ETSI TS 136 423; LTE; Evolved Universal Terrestrial Radio Access Network (E-UTRAN); X2 Application Protocol (X2AP) (3GPP TS 36.423 version 8.6.0 Release 8)"; Jul. 2009; 103 pages total.

ETSI TS 136 413; LTE; Evolved Universal Terrestrial Radio Access (E-UTRA); S1 Application Protocol (S1AP) (3GPP TS 36.413 version 8.6.1 Release 8); Jul. 2009; 218 pages total.

Ericsson; "Scheduling of ETWS Notifications", Tdoc R2-085263, 3GPP, Sep. 9, 2008, 3 pages total.

Huawei, "Paging receiving for ETWs capable UEs in RRC_CONNECTED", 3GPP R2-085526, 3GPP, Sep. 29, 2008.

* cited by examiner

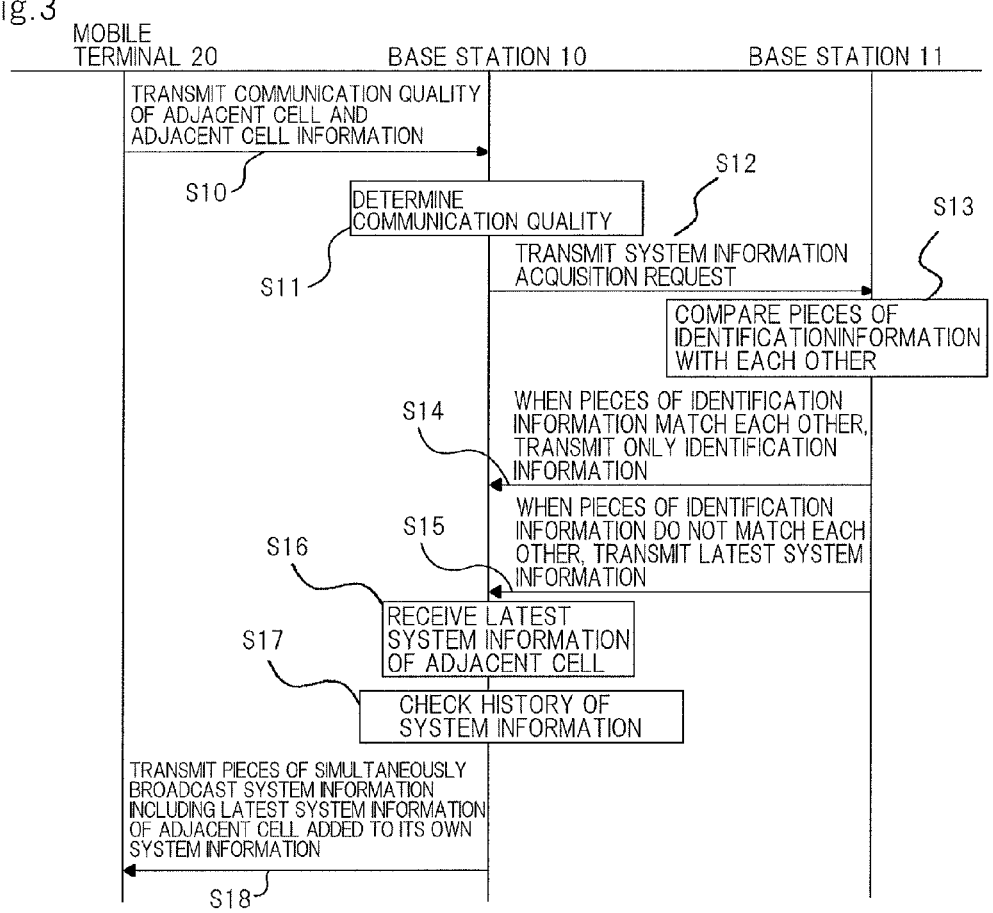
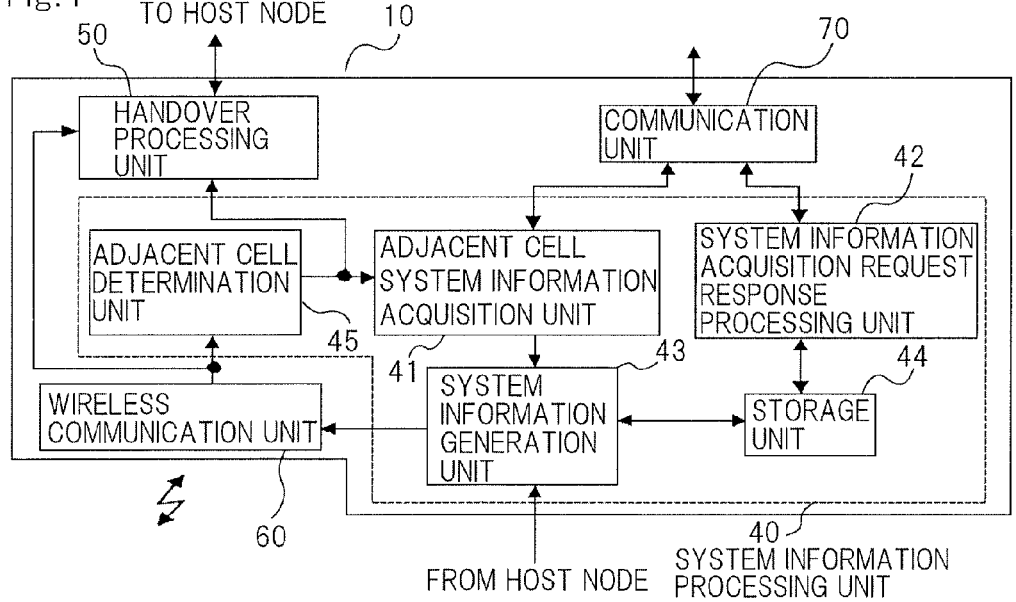

BASE STATION, MOBILE COMMUNICATION SYSTEM, AND SYSTEM INFORMATION TRANSMISSION METHOD

CROSS REFERENCE TO RELATED APPLICATIONS

This application is a National Stage of International Application No. PCT/JP2011/051708 filed Jan. 28, 2011, claiming priority based on Japanese Patent Application No. 2010-022073 filed Feb. 3, 2010, the contents of all of which are incorporated herein by reference in their entirety.

TECHNICAL FIELD

The present invention relates to an information communication system that simultaneously broadcasts pieces of information to a mobile terminal. More particularly, the invention relates to a mobile communication system that is one of the systems provided according to wireless access specifications, namely, LTE (Long Term Evolution) and configured to simultaneously broadcast pieces of emergency information such as ETWS (Earthquake and Tsunami Warning System) information to the mobile terminal.

BACKGROUND ART

In the LTE system studied as a next generation system from a 3rd Generation, the base station simultaneously broadcasts pieces of latest ETWS information in the cell managed by itself. The mobile terminal present in the cell can acquire, in response to simultaneous paging from the base station, latest ETWS information broadcast in emergency (refer to Nonpatent Literatures 1 to 4).

Usually, on the network side, one cell is identified as a cell corresponding to the current position of the mobile terminal. The mobile terminal can acquire ETWS information in response to simultaneous paging from the base station that manages the identified cell.

CITATION LIST

Patent Literature

Nonpatent Literature 1: LTE/3GPP TS36.300 v8.9.0 2009-06, Technical Specification Group Radio Access Network; Evolved Universal Terrestrial Radio Access (E-UTRA) and Evolved Universal Terrestrial Radio Access Network(E-UTRAN); Overall description; Stage 2(Release 8)

Nonpatent Literature 2: LTE/3GPP TS36.331 v8.6.0 2009-06, Technical Specification Group Radio Access Network; Evolved Universal Terrestrial Radio Access (E-UTRA); Radio Resource Control (RRC); Protocol specification (Release 8)

Nonpatent Literature 3: LTE/3GPP TS36.423 v8.6.0 2009-06, Technical Specification Group Radio Access Network; Evolved Universal Terrestrial Radio Access (E-UTRA); X2 application protocol (X2AP) (Release 8)

Nonpatent Literature 4: LTE/3GPP TS36.413 v8.6.1 2009-06, Technical Specification Group Radio Access Network; Evolved Universal Terrestrial Radio Access (E-UTRA); S1 application protocol (S1AP) (Release 8)

SUMMARY OF INVENTION

Problems to be Solved by Invention

When pieces of ETWS information that are different between adjacent cells are broadcast, and when the mobile terminal is located in an area of the cell adjacent to the other cell, it is desired that the mobile terminal acquire pieces of ETWS information respectively broadcast in the cell where it is located and in the adjacent cell.

However, in the aforementioned LTE system, one cell is identified as a cell corresponding to the current position of the mobile terminal, and the mobile terminal receives simultaneous paging only from the base station that manages the identified cell. Thus, when the mobile terminal is located in the area of the cell that is adjacent to the other cell, the mobile terminal can acquire only the ETWS information broadcast in one cell identified on the network side while it cannot acquire the ETWS information broadcast in the other cell.

It is an object of the present invention, which has been developed to solve the aforementioned problem, to provide a base station, a mobile communication system, and a system information transmission method that enables, when the mobile terminal is located in the area of the cell adjacent to the other cell, the mobile terminal to acquire pieces of information (e.g., ETWS information) respectively broadcast in the cell where it is located and in the adjacent cell.

Solution to Problems

To achieve the object, a base station according to the present invention including a cell that defines an area in which the base station can communicate with a mobile terminal by wireless, the cell being arranged adjacently to the other cell of another base station, includes: a communication unit that communicates with the other base station; and a system information processing unit that simultaneously broadcasts pieces of system information to the mobile terminal currently engaged in communication in the cell. Upon receiving, from the mobile terminal currently engaged in communication, information indicating that the mobile terminal is located in an adjacent area of the cell adjacent to the other cell, the system information processing unit acquires, from the other base station via the communication unit, other system information currently broadcast in the other cell, and transmits the acquired other system information to the mobile terminal currently engaged in communication.

A mobile communication system according to the present invention includes: a mobile terminal; and a plurality of base stations, each base station including a cell that defines an area in which the base station can communicate with the mobile terminal by wireless, the cells of the respective base stations being arranged adjacently to each other. Each base station includes: a communication unit that communicates with the other base station arranged adjacently to its own base station; and a system information processing unit that simultaneously broadcasts pieces of system information to the mobile terminal currently engaged in communication in the cell that is managed by its own base station. Upon receiving, from the mobile terminal currently engaged in communication, information indicating that the mobile terminal is located in an adjacent area of the cell that is managed by its own station adjacent to the other cell of the other base station, the system information processing unit acquires, from the other base station via the communication unit, other system information currently broadcast in the other cell, and transmits the acquired other system information to the mobile terminal currently engaged in communication.

A system information processing method according to the present invention implemented in a base station that includes a cell that defines an area in which the base station can communicate with a mobile terminal by wireless, the cell being arranged adjacently to the other cell of another base station, includes: transmitting system information for use in the base station to the mobile terminal currently engaged in communication in the cell; receiving, from the mobile terminal currently engaged in communication, a signal to determine whether the mobile terminal is located in an adjacent area of the cell adjacent to the other cell; and when it is determined, based on the received signal, that the mobile terminal currently engaged in communication is located in the adjacent area, acquiring, from the other base station, other system information currently broadcast in the other cell, and transmitting the acquired other system information together with the system information for use in the base station to the mobile terminal currently engaged in communication.

BRIEF DESCRIPTION OF DRAWINGS

FIG. 3 is an explanatory view showing the operation of the mobile communication system shown in FIG. 1.

FIG. 4 is a block diagram showing the configuration of the base station of a mobile communication system according to another exemplary embodiment of the present invention.

Figure 1:
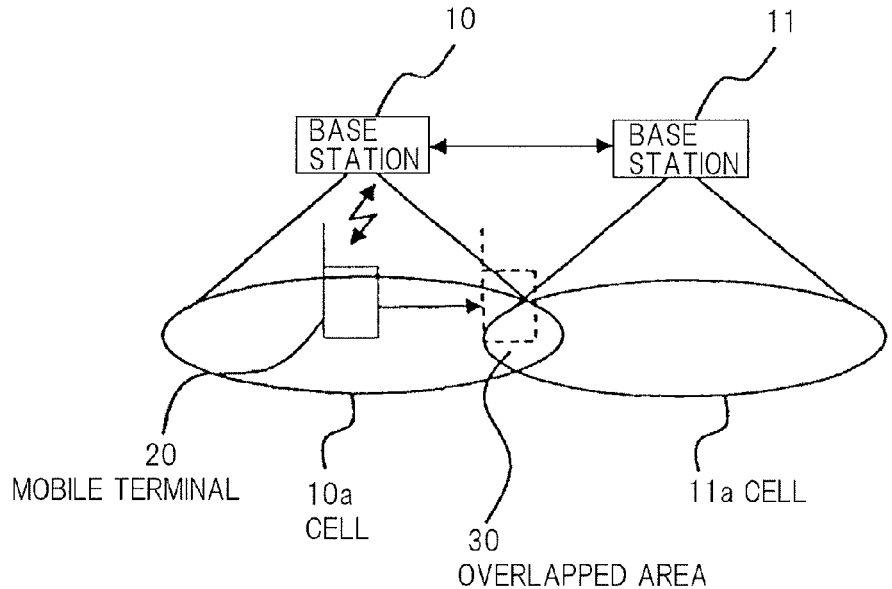
FIG. 1 is a block diagram showing the configuration of a mobile communication system according to an exemplary embodiment of the present invention.

REFERENCE NUMERALS 10, 11: Base station
10a, 11a: Cell
20: Mobile terminal
30: Overlapped area
40: System information processing unit
41: Adjacent cell system information acquisition unit
42: System information acquisition request response processing unit
43: System information generation unit
44: Storage unit
45: Adjacent cell determination unit
60: Wireless communication unit
70: Communication unit

DESCRIPTION OF EMBODIMENTS

Hereinafter, referring to the drawings, an embodiment of the present invention is described.

FIG. 1 is a block diagram showing a configuration of a mobile communication system according to an exemplary embodiment of the present invention.

Referring to FIG. 1, the mobile communication system of this embodiment includes mobile terminal 20, and base stations 10 and 11 each including a cell defining a range within which the base station can communicate with mobile terminal 20 by wireless. The number of mobile terminals 20 is not limited to one, but can be plural. Not limited to 2, the number of base stations can be 3 or more. Cell 10a of base station 10 is adjacent to cell 11a of base station 11.

Base stations 10 and 11 can communicate with each other. Base stations 10 and 11 are connected by, for example, a dedicated communication line, to be able to transfer information therebetween. Base stations 10 and 11 are similar in configuration.

Figure 2:
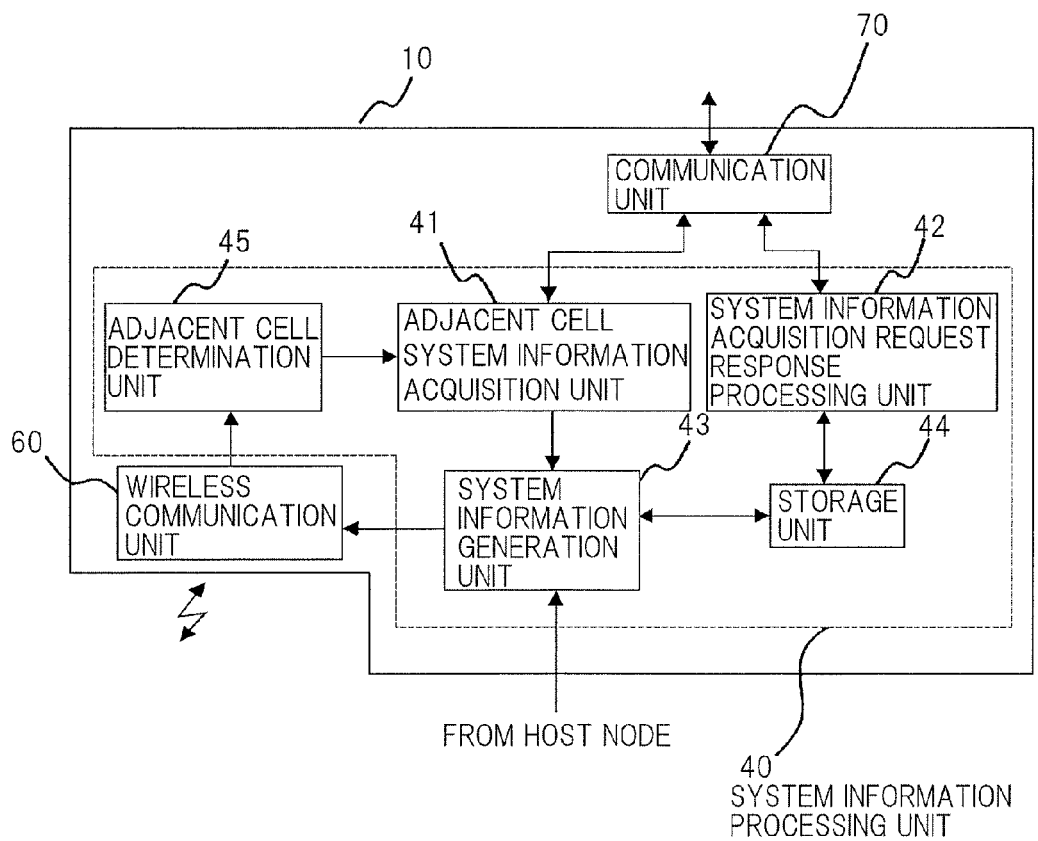
FIG. 2 is a block diagram showing the configuration of the base station of the mobile communication system shown in FIG. 1.

FIG. 2 shows the configuration of base station 10. Base station 10 shown in FIG. 2 includes system information processing unit 40, wireless communication unit 60, and communication unit 70.

Communication unit 70 communicates with another base station (base station 11 in the configuration shown in FIG. 1). Wireless communication unit 60 communicates, by wireless, with mobile terminal 20 located in the cell managed by base station 10. Through this wireless communication, paging can be carried out for mobile terminal 20 in cell 10a.

System information processing unit 40 includes adjacent cell system information acquisition unit 41, system information acquisition request response processing unit 42, system information generation unit 43, storage unit 44, and adjacent cell determination unit 45.

Adjacent cell determination unit 45 receives, through wireless communication unit 60, a signal including information indicating communication quality of an adjacent cell and adjacent cell information from mobile terminal 20. The communication quality of the adjacent cell is, for example, a result of measuring the reception level (reception power) of a signal (electric wave) from the base station that manages the adjacent cell. The adjacent cell information is information to identify the adjacent cell, for example, identification information of the base station that manages the adjacent cell. These pieces of information can be acquired from, for example, "Measurement Report" of RRC (Radio Resource Control).

After reception of the signal including the information indicating the communication quality of the adjacent cell and the adjacent cell information from mobile terminal 20, adjacent cell determination unit 45 determines whether the communication quality is equal to or more than a threshold value. The determination result is supplied, together with the adjacent cell information acquired from mobile terminal 20, from adjacent cell determination unit 45 to adjacent cell system information acquisition unit 41. In this case, for example, in FIG. 1, the threshold value enables identifying the location of mobile terminal 20 in overlapped area 30 (or near overlapped area 30) of cells 10a and 11a.

After reception of the determination result indicating that the communication quality is equal to or more than the threshold value together with the adjacent cell information from adjacent cell determination unit 45, adjacent cell system information acquisition unit 41 transmits a system information acquisition request to the base station identified based on the adjacent cell information through communication unit 70. The system information acquisition request includes the identification information of base station 10, the identification information of system information broadcast in the cell that is managed by base station 10, and the adjacent cell information acquired from mobile terminal 20. The system information is, for example, ETWS information. When it receives the determination result indicating that the communication quality is less than the threshold value, adjacent cell system information acquisition unit 41 does not transmit any system information acquisition request.

After reception of a system information acquisition response from the base station that has received the system information acquisition request via communication unit 70, adjacent cell system information acquisition unit 41 supplies information of the received system information acquisition response to system information generation unit 43. There is a case where the identification information of the system information, that has been transmitted by base station 10 at the time of the system information acquisition request, is returned as a system information acquisition response, and there is a case where the adjacent cell information, the latest system information broadcast in the base station that has received the system information acquisition request, and identification information thereof are returned as a system information acquisition response.

System information generation unit 43 receives, from the host station (host node) of base station 10, system information for base station 10, identification information thereof, and information necessary for paging. Upon receiving the system information and the identification information from the host node, system information generation unit 43 stores the received system information and identification information as history information in storage unit 44. System information generation unit 43 generates paging information based on the information received from the host node.

When the system information acquisition response supplied from adjacent cell system information acquisition unit 41 includes the latest system information of the adjacent cell, system information generation unit 43 checks whether or not the identification information of the latest system information of the adjacent cell is included in the history of the system information stored in storage unit 44. When the identification information of the latest system information of the adjacent cell is not included in the history, system information generation unit 43 stores the latest system information of the adjacent cell and identification information thereof in storage unit 44, and executes notification processing of adjacent cell system information in which the latest system information of the adjacent cell and the identification information thereof is transmitted to mobile terminal 20 currently engaged in communication in base station 10. For the notification processing, for example, there is a method for notifying the mobile terminal, that is currently engaged in communication in the cell managed by base station 10, of the system information of the adjacent cell and the identification information that is limited to a call, and there is a method for notifying all the mobile terminals located in the overlapped area of the system information of the adjacent cell and the identification information for calls.

The paging information generated by system information generation unit 43 is transmitted to mobile terminal 20 located in the cell managed by base station 10 via wireless communication unit 60. Storage unit 44 stores the history information of the system information and the identification information. From this history information, latest system information currently broadcast in the cell managed by base station 10 can be known.

System information acquisition request response processing unit 42 receives the system information acquisition request from another base station (base station 11 in the configuration shown in FIG. 1) via communication unit 70. Upon receiving the system information acquisition request, system information acquisition request response processing unit 42 checks whether the adjacent cell information included in the system information acquisition request indicates base station 10. System information acquisition request response processing unit 42 executes response processing for the system information acquisition request only if the adjacent cell information indicates base station 10.

Upon receiving the system information acquisition request addressed to base station 10, system information acquisition request response processing unit 42 acquires, from storage unit 44, the identification information of the system information currently broadcast in the cell that is managed by base station 10, and compares the acquired identification information with the identification information of system information currently broadcast in the cell of the request source base station, which is included in the received system information acquisition request.

When the identification information of the latest identification information that is provided in base station 10 does not match the identification information of the request source system information, system information acquisition request response processing unit 42 transmits a system information acquisition response including the latest system information that is provided in base station 10, the identification information thereof, and the identification information of base station 10 to the request source base station. When the identification information of the latest identification information of base station 10 matches the identification information of the request source system information, system information acquisition request response processing unit 42 transmits a system information acquisition response including the identification information of the system information included in system information acquisition request to the request source base station. When transmitting the system information acquisition response, system information acquisition request response processing unit 42 identifies the request source based on the identification information of the request source base station included in the system information acquisition request.

Base station 11 and other base stations are similar in configuration to that shown in FIG. 2.

Next, the operation of the mobile communication system according to this embodiment is described.

FIG. 3 is a schematic explanatory view showing an operation; in the configuration shown in FIG. 1, when mobile terminal 20 located in cell 10a moves close to overlapped area 30, base station 10 acquires latest system information from base station 11 that manages cell 11a adjacent to cell 10a, and supplies the acquired system information to mobile terminal 20.

First, mobile terminal 20 transmits the communication quality (reception level) and adjacent cell information of adjacent cell 11a to base station 10 (step S10).

Then, adjacent cell determination unit 45 of base station 10 determines whether the communication quality regarding adjacent cell 11a from mobile terminal 20 is equal to or more than a threshold value (step S11). When the communication quality of adjacent cell 11a is equal to or more than the threshold value, adjacent cell system information acquisition unit 41 of base station 10 transmits a system information acquisition request (adjacent cell information, identification information of base station 10, and identification information of system information currently broadcast in cell 10a) to base station 11 (step S12).

After transmission of the system information acquisition request from base station 10 to base station 11, system information request response processing unit 42 of base station 11 compares the identification information of the system information currently broadcast in cell 10a, which is included in the system information acquisition request, with the identification information of system information currently broadcast in cell 11a (step S13).

When matching of the pieces of identification information is determined in step S13, system information request response processing unit 42 of base station 11 transmits a system information acquisition response including the identification information of the system information included in the system information acquisition request to base station 10 (step S14).

When nonmatching of the pieces of identification information is determined in step S13, system information request response processing unit 42 of base station 11 transmits a system information acquisition response including the system information currently broadcast in step 11a, the identification information thereof, and the identification information of base station 11 (adjacent cell information) to base station 10 (step S15).

In base station 10, adjacent cell system information acquisition unit 41 receives the system information acquisition response transmitted from base station 11 via communication unit 70, and checks whether the received system information acquisition response includes adjacent cell information, the latest system information of adjacent cell 11a, and the identification information thereof. Only if the system information acquisition response includes adjacent cell information, the latest system information of adjacent cell 11a, and the identification information thereof, will adjacent cell system information acquisition unit 41 supply the system information acquisition response to system information generation unit 43 (step S16).

Further, in base station 10, system information generation unit 43 checks whether the identification information of the latest system information of adjacent cell 11a included in the system information acquisition response supplied from adjacent cell system information acquisition unit 41 is included in the history of the system information stored in storage unit 44 (step S17).

When it is determined in step S17 that the identification information of the latest system information of adjacent cell 11a is not included in the history, system information generation unit 43 stores the latest system information of adjacent cell 11a and the identification information thereof in storage unit 44 in base station 10, and adds the latest system information of adjacent cell 11a and the identification information to the currently broadcast system information. Then, system information generation unit 43 transmits the system information (pieces of simultaneously broadcast information including the system information and the identification information currently broadcast in base station 10 and the latest system information and the identification information broadcast in the adjacent cell) to mobile terminal 20 via wireless communication unit 60 (step S18).

When it is determined in step S17 that the identification information of the latest system information of adjacent cell 11a is included in the history, system information generation unit 43 adds only the identification information of the latest system information of adjacent cell 11a to the currently broadcast system information. Then, system information generation unit 43 transmits the system information (pieces of simultaneously broadcast information including the system information and the identification information currently broadcast in base station 10 and the identification information of the latest system information broadcast in the adjacent cell) to mobile terminal 20 via wireless communication unit 60.

According to the aforementioned processing, when the pieces of system information that are different between cells 10a and 11a are broadcast, and when mobile terminal 20 located in cell 10a moves close to overlapped area 30 of cells 10a and 11a, the system information and the identification information broadcast in cell 11a are supplied together with the system information and the identification information broadcast in cell 10a to mobile terminal 20.

After having received the system information to which only the identification information of the latest system information of adjacent cell 11a has been added from base station 10, mobile terminal 20 recognizes the latest system information of adjacent cell 11a that it received in the past. Mobile terminal 20 holds, for each identification information, pieces of system information received in the past, and acquires, by referring to the held information, system information corresponding to the identification information of the latest system information of adjacent cell 11a included in the pieces of simultaneously broadcast information. The acquisition of the system information by referring to the history thus enables efficient use of wireless resources. However, in this case, on the base station side, the history of the pieces of simultaneously broadcast system information must be held for each mobile terminal, and checking at step S17 must be carried out for each mobile terminal.

When there is a plurality of mobile terminals in addition to mobile terminal 20 in cell 10a, it is desired that only the mobile terminal located near overlapped area 30 receive the system information of the adjacent cell. Herein is briefly described a method according to which only the mobile terminal that is located near overlapped area 30 receives the system information of the adjacent cell.

In step S10, when transmitting the adjacent cell information and the communication quality of the adjacent cell to the base station, the mobile terminal transmits its own identification information. In the base station, adjacent cell determination unit 45 supplies the identification information of a mobile terminal, in which the communication quality of the adjacent cell is equal to or more than the threshold value, to adjacent cell system information acquisition unit 41.

In step S16, after having received the system information acquisition response including the latest system information of the adjacent cell, adjacent cell system information acquisition unit 41 supplies information of the system information acquisition response together with the identification information of the mobile terminal supplied from adjacent cell determination unit 45 to system information generation unit 43. In step S18, system information generation unit 43 generates pieces of simultaneously broadcast system information in which the latest system information of the adjacent cell and the identification information of the mobile terminal located near the overlapped area are added to the system information broadcast in the cell that is managed by base station 10. These pieces of system information are simultaneously broadcast to each mobile terminal in the cell that is managed by base station 10 via wireless communication unit 60.

After reception of the pieces of simultaneously broadcast system information, each mobile terminal determines whether the identification information of the mobile terminal included in the pieces of simultaneously broadcast information matches its own identification information. Only when it is determined that the pieces of identification information match each other will the mobile terminal execute specific processing for the received pieces of simultaneously broadcast system information. The specific processing is, for example, processing to display the pieces of simultaneously broadcast system information.

(Another Exemplary Embodiment)

FIG. 4 is a block diagram showing the configuration of the base station of a mobile communication system according to another exemplary embodiment of the present invention.

The mobile communication system according to this embodiment is similar in configuration to that shown in FIG. 1. Each of a plurality of base stations constituting the mobile communication system according to this embodiment has a configuration shown in FIG. 4.

The base station shown in FIG. 4 includes handover processing unit 50 and is different from the base station shown in FIG. 2. Other components are similar to those shown in FIG. 2.

A determination result by adjacent cell determination unit 45 is supplied to adjacent cell system information acquisition unit 41 and to handover processing unit 50.

Mobile terminal 20 transmits a signal including information indicating the communication quality of a cell and cell information in the cell where it is located and transmits a signal including information indicating the communication quality of an adjacent cell and adjacent cell information to a base station that manages the cell.

For example, when mobile station 20 is located in cell 10a of base station 10, as described above, the communication quality of the cell is the result of measuring the reception level (reception power) of a signal (electric wave) from base station 11. The adjacent cell information is the identification information of base station 11. The communication quality of the cell where mobile terminal 20 is located is the result of measuring the reception level (reception power) of a signal (electric wave) from base station 10. The cell information is the identification information of base station 10. These pieces of information can also be acquired from the aforementioned "Measurement Report" of the RRC (Radio Resource Control).

Handover processing unit 50 receives, from mobile terminal 20 in the cell that is managed by its own base station through wireless communication unit 60, a signal including information indicating the communication quality of the cell and the cell information, and a signal including information indicating the communication quality of the adjacent cell and the adjacent cell information. When adjacent cell determination unit 45 determines that the communication quality of the adjacent cell is equal to or more than a threshold value, and that the communication quality of the adjacent cell is higher than that of the cell that is managed by its own base station, handover processing unit 50 executes handover processing to the base station that manages the adjacent cell. The handover processing is a well-known technology, and thus detailed description thereof is omitted.

According to the mobile communication system of this embodiment, for example, when mobile terminal 20 is located in the area of cell 10a of base station 10 adjacent to cell 11a, and when the communication quality of adjacent cell 11a is equal to or more than the threshold value, system information processing unit 40 of base station 10 generates pieces of simultaneously broadcast system information including the system information and the identification information thereof broadcast in cell 10a and the system information and the identification information thereof broadcast in cell 11a. Then, the pieces of simultaneously broadcast system information are transmitted from wireless communication unit 60 to mobile terminal 20.

When the communication quality of adjacent cell 11a is equal to or more than the threshold value, and higher than the communication quality of cell 10a, handover processing unit 50 of base station 10 executes handover processing to base station 11 for mobile terminal 20.

Thus, mobile terminal 20 can acquire the system information and the identification information thereof broadcast in cell 11a that is a moving destination before handover processing to base station 11 is executed.

The mobile communication system according to this embodiment can be easily applied to the existing mobile communication system. For example, in a configuration where base station 10 determines execution of handover processing to the adjacent cell after reception of the "Measurement Report" of the RRC, a system information acquisition request is set as "X2-AP: HANDOVER REQUEST", an information acquisition request is set as "X2-AP: HANDOVER REQUEST ACKNOWLEDGE", and the system information notification of the adjacent cell is set as "Connection Reconfiguration". Accordingly, these pieces of information can be combined with a message between the nodes of an already standardized protocol. As a result, ETWS information broadcast in the cell (adjacent cell) of the handover destination can be acquired during handover processing, thereby hastening the arrival time of the ETWS information at the mobile terminal.

In the mobile communication system according to each embodiment as described above, the base station determines the communication quality of the adjacent cell based on the threshold value to determine whether to acquire, from the adjacent cell, the latest ETWS information broadcast in an emergency in the adjacent cell. However, the present invention is not limited to this. For example, the mobile terminal can transmit position information indicating its own current position by using a GPS (Global Polishing System) or the like, and the base station can determine whether the mobile terminal is located in the adjacent area based on the position information and the stored position information indicating its own position. In this case, when the mobile terminal is located in the position of the adjacent area, the latest ETWS information broadcast in emergency in the adjacent cell is supplied to the mobile terminal.

According to determination based on the aforementioned position information, the accuracy of determining whether or not to transmit the pieces of simultaneously broadcast information can be improved. As a result, wireless resources can efficiently be used.

The number of cells managed by one base station can be plural. In this case, in the procedure shown in FIG. 3, communication quality determination is carried out for each cell. A system information acquisition request includes the identification information of a cell. The history of system information also includes the identification information of a cell.

According to the present invention described above, the mobile terminal can acquire the system information (e.g., ETWS information) broadcast in the cell where the terminal is located and the adjacent cell. Thus, a greater number of pieces of useful system information can be provided to the user who has the mobile terminal.

The present invention has been described by way of embodiments. However, the present invention is not limited to the embodiments. Various changes understandable to those skilled in the art can be made of the configuration and the operation of the present invention without departing from the gist of the invention.

This application claims priority from Japanese Patent Application No. 2010-022073 filed Feb. 3, 2010, which is hereby incorporated by reference herein in its entirety.

What is claimed is:

1. A base station including a cell that defines an area in which the base station can communicate with a mobile terminal by wireless, the cell being arranged adjacently to the other cell of another base station, the base station comprising:
 a communication unit that communicates with the other base station; and
 a system information processing unit that simultaneously broadcasts pieces of emergency information to the mobile terminal currently engaged in communication in the cell,
 wherein upon receiving, from the mobile terminal currently engaged in communication, information indicating that the mobile terminal is located in an adjacent area of the cell adjacent to the other cell, the system information processing unit acquires, from the other base station via the communication unit, other emergency information currently broadcast in the other cell, and transmits the acquired other emergency information to the mobile terminal currently engaged in communication,
and wherein the system information processing unit includes:
a system information generation unit that generates pieces of emergency information including emergency information and identification information thereof, and that simultaneously broadcasts the pieces of emergency information to the mobile terminal currently engaged in communication;
a determination unit that receives, from the mobile terminal currently engaged in communication, communication quality information including a first reception level measuring result measuring a reception level of a signal from the other base station and identification information to identify the other base station, and that determines whether the first reception level measuring result of the communication quality information is equal to or more than a threshold value; and
a system information acquisition unit that transmits, when the determination unit has determined that the first reception level measuring result is equal to or more than the threshold value, a system information acquisition request including identification information to identify emergency information currently broadcast in the cell to the other base station via the communication unit, and that acquires response information of the system information acquisition request from the other base station via the communication unit,
and wherein when the response information acquired by the system information acquisition unit includes the other emergency information broadcast in the other cell and identification information thereof, the system information generation unit adds the other emergency information and the identification information to the pieces of emergency information.

2. The base station according to claim 1,
wherein the system information processing unit further includes a response processing unit that receives, from the other base station via the communication unit, a system information acquisition request including the identification information of the other emergency information currently broadcast in the other cell, which is addressed to the base station,
and wherein the response processing unit determines whether the identification information of the other emergency information included in the system information acquisition request addressed to the base station matches the identification information of the emergency information currently broadcast in the cell, transmits, when nonmatching is determined, another piece of response information including the emergency information currently broadcast in the cell and the identification information thereof to the other base station via the communication unit, and transmits, when matching is determined, another piece of response information including the identification information of the other emergency information included in the system information acquisition request addressed to the base station to the other base station via the communication unit.

3. The base station according to claim 1,
wherein the system information processing unit further includes a storage unit that stores the emergency information and the identification information thereof simultaneously broadcast to the mobile terminal currently engaged in communication,
and wherein the system information generation unit determines whether the identification information of the other emergency information included in the response information acquired by the system information acquisition unit has been stored in the storage unit, adds, when nonstorage is determined, the other emergency information and the identification information included in the response information to the pieces of emergency information, and adds, when storage is determined, only the identification information of the other emergency information included in the response information to the pieces of emergency information.

4. The base station according to claim 1, further comprising a handover processing unit that acquires, from the mobile terminal currently engaged in communication, the first reception level measuring result and a second reception level measuring result measuring a reception level of a signal from the base station, and that executes handover processing to the other base station for the mobile terminal currently engaged in communication when the first reception level measuring result is equal to or more than the threshold value, and higher than the second reception level measuring result.

5. The base station according to claim 1, wherein the system information processing unit acquires, from the mobile terminal currently engaged in communication, position information regarding a current position of the mobile terminal, and determines whether the mobile terminal currently engaged in communication is located in the adjacent area based on the acquired position information and position information of the base station that has been held beforehand.

6. A mobile communication system comprising:
a mobile terminal; and
a plurality of base stations, each base station including a cell that defines an area in which the base station can communicate with the mobile terminal by wireless, the cells of the respective base stations being arranged adjacently to each other, wherein:
each base station includes:
a communication unit that communicates with the other base station arranged adjacently to its own base station; and
a system information processing unit that simultaneously broadcasts pieces of emergency information to the mobile terminal currently engaged in communication in the cell of its own base station; and
when upon receiving, from the mobile terminal currently engaged in communication, information indicating that the mobile terminal is located in an adjacent area of the cell of the base station adjacent to the other cell of the other base station, the system information processing unit acquires, from the other base station via the communication unit, other emergency information currently broadcast in the other cell, and transmits the acquired other emergency information to the mobile terminal currently engaged in communication,
and wherein the system information processing unit includes:
a system information generation unit that generates pieces of emergency information including emergency information and identification information thereof, and that simultaneously broadcasts the pieces of emergency information to the mobile terminal currently engaged in communication;
a determination unit that receives, from the mobile terminal currently engaged in communication, communication quality information including a first reception level measuring result measuring a reception level of a signal from the other base station and identification information to identify the other base station, and that determines whether the first reception level measuring result of the communication quality information is equal to or more than a threshold value; and a system information acquisition unit that transmits, when the determination unit has determined that the first reception level measuring result is equal to or more than the threshold value, a system information acquisition request including identification information to identify emergency information currently broadcast in the cell to the other base station via the communication unit, and that acquires response information of the system information acquisition request from the other base station via the communication unit, and wherein when the response information acquired by the system information acquisition unit includes the other emergency information broadcast in the other cell and identification information thereof, the system information generation unit adds the other emergency information and the identification information to the pieces of emergency information.

7. A system information processing method implemented in a base station that includes a cell that defines an area in which the base station can communicate with a mobile terminal by wireless, the cell being arranged adjacently to the other cell of another base station, the method comprising:

transmitting emergency information for use in the base station to the mobile terminal currently engaged in communication in the cell;

receiving, from the mobile terminal currently engaged in communication, a signal to determine whether the mobile terminal is located in an adjacent area of the cell adjacent to the other cell; and when it is determined, based on the received signal, that the mobile terminal currently engaged in communication is located in the adjacent area, acquiring, from the other base station, other emergency information currently broadcast in the other cell, and transmitting the acquired other emergency information together with the emergency information for use in the base station to the mobile terminal currently engaged in communication, wherein the method further comprises:

generating pieces of emergency information including emergency information and identification information thereof, and simultaneously broadcasting the pieces of emergency information to the mobile terminal currently engaged in communication;

receiving, from the mobile terminal currently engaged in communication, communication quality information including a first reception level measuring result measuring a reception level of a signal from the other base station and identification information to identify the other base station, and determining whether the first reception level measuring result of the communication quality information is equal to or more than a threshold value:

transmitting, when the determination unit has determined that the first reception level measuring result is equal to or more than the threshold value, a system information acquisition request including identification information to identify emergency information currently broadcast in the cell to the other base station, and acquiring response information of the system information acquisition request from the other base station; and when the response information acquired by the system information acquisition unit includes the other emergency information broadcast in the other cell and identification information thereof, adding the other emergency information and the identification information to the pieces of emergency information.

* * * * *